W. SELLERS & H. C. BECK.
GUARDED CASTER.
APPLICATION FILED AUG. 10, 1911.

1,018,211.

Patented Feb. 20, 1912.

Witnesses;

Inventors;
Wilfred Sellers and
Henry C. Beck,
By Minturn & Worner,
Attorneys.

UNITED STATES PATENT OFFICE.

WILFRED SELLERS AND HENRY C. BECK, OF ELWOOD, INDIANA.

GUARDED CASTER.

1,018,211.  Specification of Letters Patent.  Patented Feb. 20, 1912.

Application filed August 10, 1911. Serial No. 643,464.

*To all whom it may concern:*

Be it known that we, WILFRED SELLERS and HENRY C. BECK, citizens of the United States, residing at Elwood, in the county of Madison and State of Indiana, have invented certain new and useful Improvements in Guarded Casters, of which the following is a specification.

This invention is to protect furniture from crawling bugs and insects by surrounding their roller casters with a reservoir to contain a liquid that will drown or poison them.

The object of the invention is to provide a liquid holder the bottom of which has a raised center to drain the liquid away form the opening through which the caster stem passes, into an annular channel where it will be collected at the outer wall of the vessel at the most effective locality to kill bugs and insects before they reach the stem, and also to shorten the caster by assembling the roller-frame within the concavity of the bottom of the liquid holder.

Another object is to provide a guard for the liquid holder which will eliminate the danger of children getting at the contained poisons, and also keep the liquid from being splashed out by a broom in sweeping or by the moving of the furniture, and to provide a guard which will permit of ready access in cleaning out the holding vessel.

A further object is to provide a caster with our invention, which can be used in any standard socket, and without danger of splitting the post.

We accomplish the above objects by the mechanism illustrated in the accompanying drawing, in which—

Figure 1:
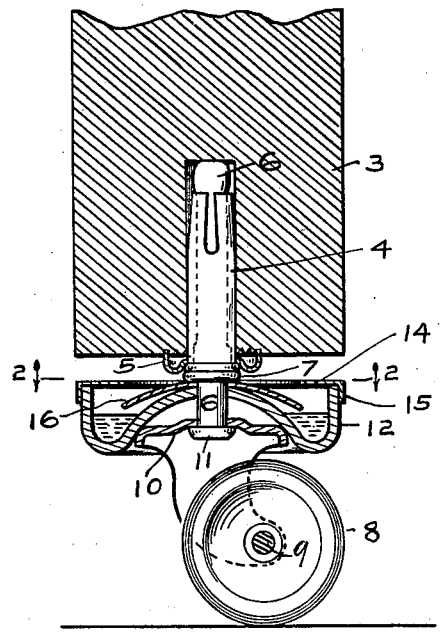
Figure 2:
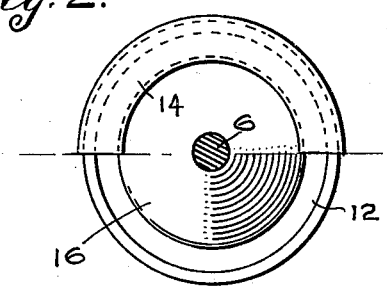

Figure 1 is a vertical section of the lower end of a furniture leg or post with our improved caster in operative position, and Fig. 2 is a horizontal section on the line 2—2 of Fig. 1, with half or the rim-cover removed.

3 is the post of any article of furniture, such as a cupboard, kitchen cabinet, safe, table, bed, or the like, to be protected. It has the usual vertical end hole to receive a metal socket 4, which may be of any usual and suitable size and shape, such for example, as any of the present standard caster sockets in which 5 is a serrated disk to engage the end of the post to keep the socket from rotating.

6 is a caster-stem of usual construction, including shoulder 7 near its lower end, which stem is removably secured in the socket 4, the insertion being limited by shoulder 7.

8 is a roller mounted on axle 9, the latter being journaled in the parallel members of the frame 10. The frame 10 has a hole through which the lower end of stem 6 is passed and the withdrawal of the stem prevented by riveting its end to form a head 11.

12 is a liquid-holding cup or vessel of approximately the same diameter as the post 3. The bottom of the vessel 12 has a middle hole through which the end of stem 6 is passed before frame 10 is assembled on said stem. The bottom of vessel 12 is raised or rounded upwardly around its said middle hole until its highest projection is on a level with or is above the rim of the vessel. This forms an underside cavity to receive the caster frame 10 thereby bringing the roller closer to the end of the post 3 which reduces the leverage of the stem 6 and lessens the splitting strain on the post. The raised bottom also drains the contents of the vessel toward the outer edge of the latter and forms an annular channel in which the same quantity of liquid will stand deeper than it would be at any portions if the bottom were flat. This prolongs the efficiency of the device under conditions of evaporation until the liquid is entirely gone. It also places the liquid at the outer edge, as remote as possible from the stem of the caster to prevent leakage and lessens the chances of the insect reaching the furniture by way of the stem.

As a guard to keep children from reaching the poisoned liquid we provide a loose cover 14, which is held in position by a depending flange 15 on the outside of the vessel. This cover has a large middle opening which bars access to the caster stem over the cover, and through which the insect will fall into the poisonous liquid below. This cover will be readily raised for the purpose of cleaning the vessel and it will assist in keeping the liquid from splashing out when the furniture, such as a bed or table, is moved in sweeping, and to keep the straws of a broom from entering and sweeping out the liquid. As a further guard against access by children and the splashing and sweeping out of the liquid we prefer to place a concave shield of sheet metal 16 around the stem between its shoulder and the vessel.

While we have here shown and described the best form of our device that we now know of, it is obvious that changes may be made in various ways without departing from the spirit of our invention, and we therefore do not desire to be limited to the embodiment here shown, but What we do claim as new and wish to secure by Letters Patent of the United States, is—

1. A vessel adapted to hold a liquid, having a bottom with a central hole, said bottom being rounded upwardly approximately as high as the rim of the receptacle around said hole, a caster having a stem which is passed through said hole in the bottom of the vessel, said stem having a shoulder above the bottom of the vessel, and a frame entering the concavity of said bottom and secured to the stem, said bottom being rigidly secured between said frame and shoulder on the stem.

2. A vessel adapted to hold a liquid, having a bottom with a central hole, said bottom being rounded upwardly approximately as high as the rim of the receptacle around said hole, a caster having a stem which is passed through said hole in the bottom of the vessel, said stem having a shoulder above the bottom of the vessel, a shield between the bottom of the vessel and the shoulder, and a frame entering the concavity of said bottom and secured to the stem by expanding the lower end of the stem to rigidly impinge the bottom of the vessel and the shield against the shoulder on the stem.

3. A vessel adapted to hold a liquid, having a bottom with a central hole, said bottom being rounded upwardly approximately as high as the rim of the receptacle around said hole, a caster having a stem which is passed through said hole in the bottom of the vessel said stem having a shoulder and a frame entering the concavity of said bottom, an annular cover loosely seated on the rim of the vessel, a sleeve to enter the furniture leg and in which the caster-stem is held and a concave shield secured to the stem of the caster and extending down into the vessel below the cover and held against the concave bottom of the vessel.

In witness whereof, we have hereunto set our hands and seals at Elwood, Indiana, this 26th day of July, A. D. one thousand nine hundred and eleven.

WILFRED SELLERS. [L. S.]
HENRY C. BECK. [L. S.]

Witnesses:
E. DANIELS,
R. DICKERSON.

---

Copies of this patent may be obtained for five cents each, by addressing the "Commissioner of Patents, Washington, D. C."